United States Patent [19]
Gill

[11] Patent Number: 5,872,689
[45] Date of Patent: Feb. 16, 1999

[54] PLANAR ORTHOGONAL MR READ HEAD

[75] Inventor: Hardayal Singh Gill, Portola Valley, Calif.

[73] Assignee: International Business Machines Corporation, Armonk, N.Y.

[21] Appl. No.: 626,877

[22] Filed: Apr. 3, 1996

Related U.S. Application Data

[62] Division of Ser. No. 271,924, Jul. 7, 1994, Pat. No. 5,546,254.

[51] Int. Cl.$^6$ ....................................................... G11B 5/39
[52] U.S. Cl. .............................................................. 360/113
[58] Field of Search ............................ 360/113; 324/252; 338/32 R

[56] References Cited

U.S. PATENT DOCUMENTS

| | | | |
|---|---|---|---|
| 3,887,944 | 6/1975 | Bajorek et al. | 360/113 |
| 4,103,315 | 7/1978 | Hempstead et al. | 360/110 |
| 4,972,284 | 11/1990 | Smith et al. | 360/113 |
| 5,018,037 | 5/1991 | Krounbi et al. | 360/113 |
| 5,218,497 | 6/1993 | Tanabe et al. | 360/113 |
| 5,301,079 | 4/1994 | Cain et al. | 360/113 |
| 5,327,313 | 7/1994 | Nishioka et al. | 360/113 |

OTHER PUBLICATIONS

"Sensitivity Of Orthogonal Magnetoresistive Heads", CA–05, Intermag 1993, P. Wang & M. Krounbi; IBM Research Division, Almaden Research Center, San Jose, California.

"Thin Film MR Head For High Density Rigid Disk Drive", H. Suyama et al., IEEE Transactions on Magnetics, vol. 24, No. 6, Nov. 1988, pp. 2612–2614.

"Exchange Anisotropy In Coupled Filsm Of $NI_{81}Fe_{19}$ With NiO And $Co_xNI_{1-x}O$", M.J. Carey and A.E. Berkowitz; App. Phys. Lett 60(24), 15 Jun. 1992, American Institute of Physics, pp. 3060–3062.

"Magnetic Response Of Uni–Directional Trilayered Ferromagnetic Antiferromagnetic Coupled Films", T.Imagawa et al., International Magnetics Conference, Stockholm, Sweden, Apr. 13–16, 1993.

*Primary Examiner*—David D. Davis
*Attorney, Agent, or Firm*—Gray Cary Ware & Freidenrich

[57] ABSTRACT

A high-sensitivity orthogonal magnetoresistive (MR) read head is provided which employs a single MR stripe. The MR stripe extends perpendicular to an air bearing surface (ABS) of the read head and has an easy axis which extends parallel to the ABS. Longitudinal biasing layers are magnetostatically-coupled to the MR stripe for biasing the MR stripe parallel to the ABS. The longitudinal biasing layers and the MR stripe are connected so that their film surfaces lie within a common plane. First and second leads are connected to the MR stripe in a spaced-apart relationship for conducting a sense current through the MR stripe perpendicular to the ABS. The first lead is connected to the MR stripe and the longitudinal biasing layers at the ABS in a substantially planar configuration. A transverse biasing conductor is coupled to the MR stripe for biasing the MR stripe. In the preferred embodiment, the longitudinal biasing layers are constructed of amorphous CoSm. The positioning of the MR stripe and the transverse biasing conductor with respect to first and second shield layers of the MR read head can implement enhanced longitudinal and/or transverse biasing.

12 Claims, 8 Drawing Sheets

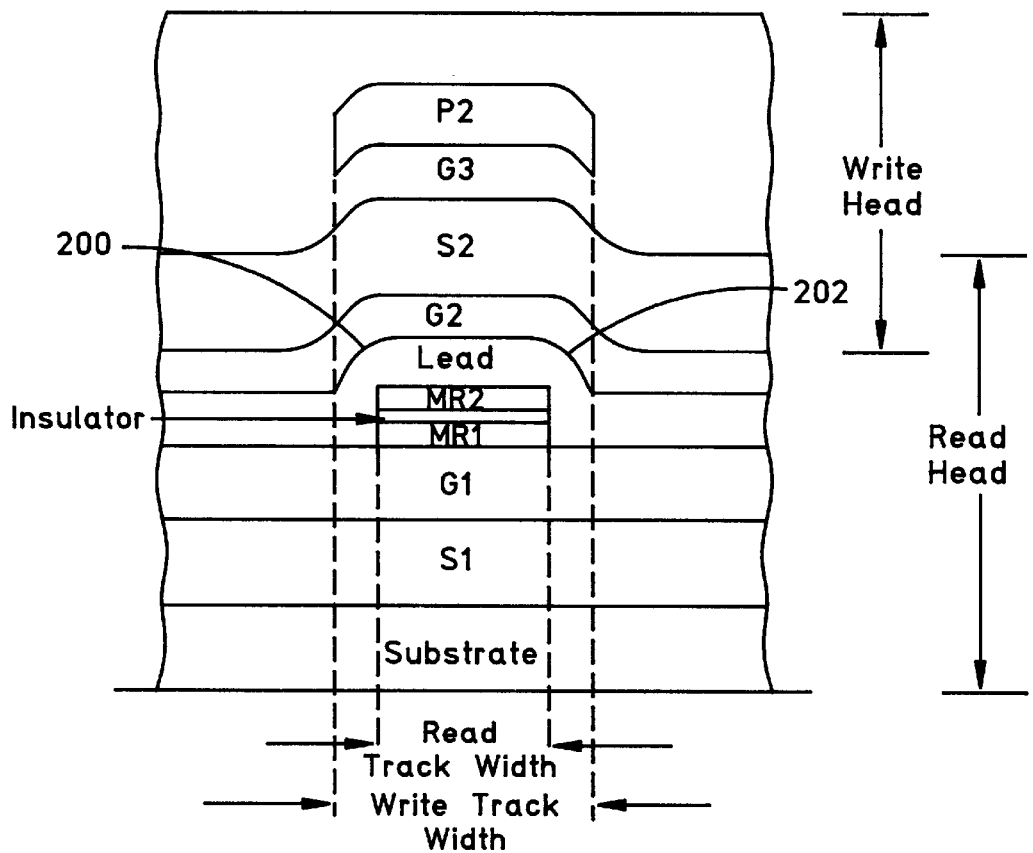
FIG. 10 (ABS PRIOR ART)
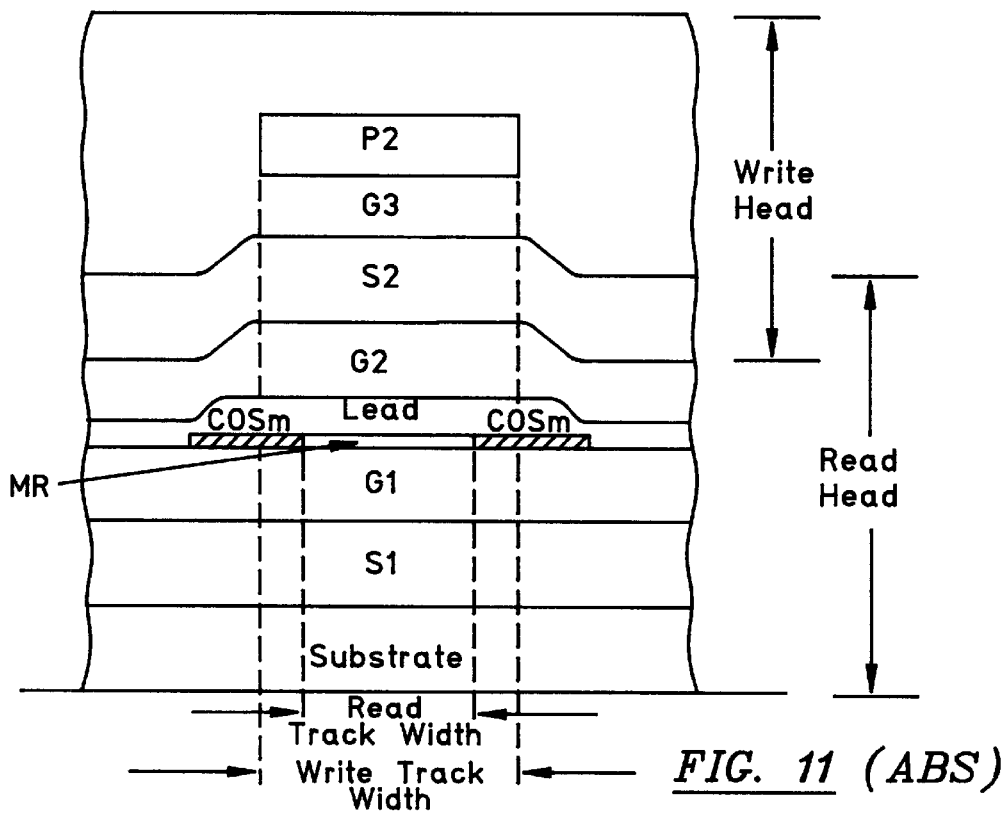
FIG. 11 (ABS)

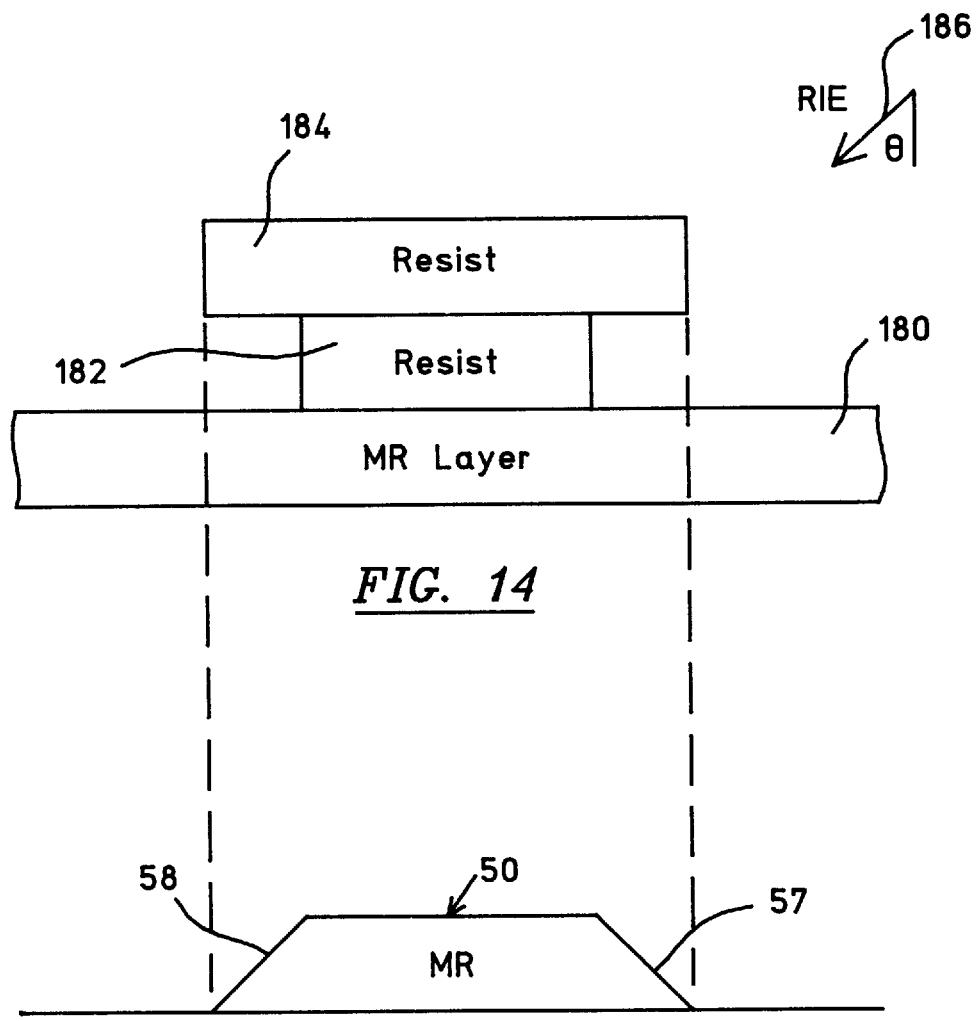

PLANAR ORTHOGONAL MR READ HEAD

CROSS-REFERENCE TO RELATED APPLICATION

This is a divisional application of co-pending application Ser. No. 08/271,924 filed Jul. 7, 1994 now U.S. Pat. No. 5,546,254.

BACKGROUND OF THE INVENTION

1. Field of the Invention

The invention relates to a magnetoresistive (MR) read head and, more particularly, to an orthogonal MR sensor for a read head which has improved sensitivity due to (1) substantial elimination of sense current shunting, and (2) increased control of transverse biasing of the MR stripe.

2. Description of the Related Art

When used herein, the term "MR read head" is intended to refer to a read head that includes a magnetoresistive sensor. An actual read head includes many details of packaging which are necessary for providing a completed commercially usable unit. These details are considered to be known to the skilled artisan.

An MR read head sensor employs an MR thin film layer, hereinafter referred to as an MR stripe, which changes resistance in response to a magnetic field from a moving magnetic medium, such as a rotating magnetic disk. The response of the MR stripe is based on how well the resistance change follows the change in magnetic field flux density. In a typical MR read head the MR stripe is sandwiched between bottom and top insulation gap layers G1 and G2 which, in turn, are sandwiched between bottom and top shield layers S1 and S2. The distance between the shield layers is called the "read gap". The smaller the read gap, the greater the resolution of the MR read head. The MR read head has considerable promise for handling high data rates (1.3 Gb/sec.) required by recent technological advances.

A merged MR head is a combined MR read head and an inductive write head. The merged head is typically mounted on or is part of a slider which has a bottom air bearing surface, hereafter referred to as ABS. When a magnetic disk is rotated with respect to the slider, the slider is supported by an air bearing slightly above (0.075 µm) the rotating magnetic disk.

There are two configurations of an MR read head. In one configuration, a sense current is conducted parallel to the ABS and in the other configuration, the sense current is conducted perpendicular to the ABS, the latter configuration being known as an orthogonal MR read head. The orthogonal read head has several advantages, namely: the amplitude of its readback signal is substantially independent of its track width and the tip of the head at the ABS can be easily grounded to protect the head from electrical shorting. However, the orthogonal read head has several basic problems.

One problem with the orthogonal MR read head is that it has very poor readback sensitivity. In order to accomplish longitudinal biasing, prior art orthogonal MR read heads employ a pair of MR stripes. Each of the MR stripes conducts a sense current which causes them to induce a longitudinal biasing field across one another. This field magnetizes both of the MR stripes into a closed flux state for the purpose of achieving domain noise-free operation. The problem with this arrangement is that the longitudinal biasing is larger than desired and it reduces the permeability of the MR stripes, causing them to be less sensitive to induced signals. A single orthogonal MR stripe could be-stabilized with longitudinal biasing by overlapping antiferromagnetic layers, such as NiMn, FeMn, or NiO, near the lateral edges of the MR stripe. The problem with this arrangement is that the region where the exchange material overlaps the MR stripe will shunt the sense current, thereby degrading sensitivity of the read head. This problem is especially troublesome in orthogonal read heads because the passive exchange-coupled regions are electrically in parallel with the active track whereas in the conventional MR head these regions are electrically in series with the active track.

Another problem is when a merged MR head is employed which is a combination of an orthogonal MR read head and an inductive write head. The merged MR head is constructed using thin film technology. After depositing the thin film layers for the orthogonal MR read head, thin film layers for the inductive write head are laid on top of the MR read head. A problem in the prior art is that the MR read head is non-planar in the area of the track width of the write head. This non-planar condition results from thick conductor leads (typically 1000 to 2000 Å) deposited at top and bottom edges of the MR stripe for providing the sense current and for detecting read voltage. The steps in height created by the conductor leads introduce curvature into the pole tip of the inductive write head. A curved pole tip of a write head will write distorted magnetic bits thereby degrading performance. An attempted solution to this problem is to reduce the thickness of the conductors leads so as to reduce the height of the step created at the top and the bottom of the MR stripe. The problem with this approach is that thinner leads increase the lead resistance which is undesirable for achieving a high sensitivity MR read head.

SUMMARY OF THE INVENTION

The present invention provides a planar orthogonal MR read head which overcomes the sensitivity and non-planar problems associated with prior art orthogonal MR read heads. In a preferred embodiment longitudinal biasing is provided by magnetostatically coupling a pair of amorphous permanent magnet CoSm layers to a pair of lateral edges of the MR stripe. The chemical composition of the CoSm is selected so that the material is in an amorphous phase and its magnetization times thickness is substantially equal to the magnetization times thickness of the MR stripe. The CoSm layers form butted junctions with the lateral edges of the MR stripe with all layers being substantially planar with respect to one another. The CoSm layers are passive regions which exhibit high electrical resistivity due to the amorphous characteristic. The high resistance minimizes shunting of the sense current through the passive regions. Furthermore, since CoSm is planar with the MR stripe, a planar surface is provided for lead layers to sit across and beyond the track width of the read head. The planar surface of the conductors in turn makes possible the fabrication of a planar pole tip for the write head portion of a merged MR head. This invention therefore describes a planar orthogonal MR read head with a superior longitudinal bias arrangement. By employing a single MR stripe the head does not suffer from excessive longitudinal bias which is caused by the field from the sense current flowing in two stripes.

An object of the present invention is to improve the sensitivity of prior art orthogonal MR read heads.

Another object is to reduce longitudinal biasing in an orthogonal MR read head.

A further object is to substantially eliminate shunting of the sense current in an MR stripe of an orthogonal MR read head.

Still another object is to achieve planarization of an orthogonal MR read head.

Still a further object is to provide an orthogonal MR read head which has improved sensitivity by eliminating over longitudinal biasing and shunting of the sense current, and is planarized so that a combined inductive write head has a planarized pole tip.

Other objects will become apparent when considered in light of the following description of the invention.

BRIEF DESCRIPTION OF THE DRAWINGS

FIG. 10 is an ABS illustration of a prior art orthogonal MR read head which employs a pair of MR stripes.

FIG. 11 is an ABS illustration of the present orthogonal MR read head which employs a single MR stripe.

FIG. 14 is a schematic illustration of an exemplary method of fabricating the tapered lateral edges of the MR stripe.

FIG. 15 is the MR stripe after fabrication of its tapered lateral edges.

DETAILED DESCRIPTION OF THE PREFERRED EMBODIMENTS

Figure 1:
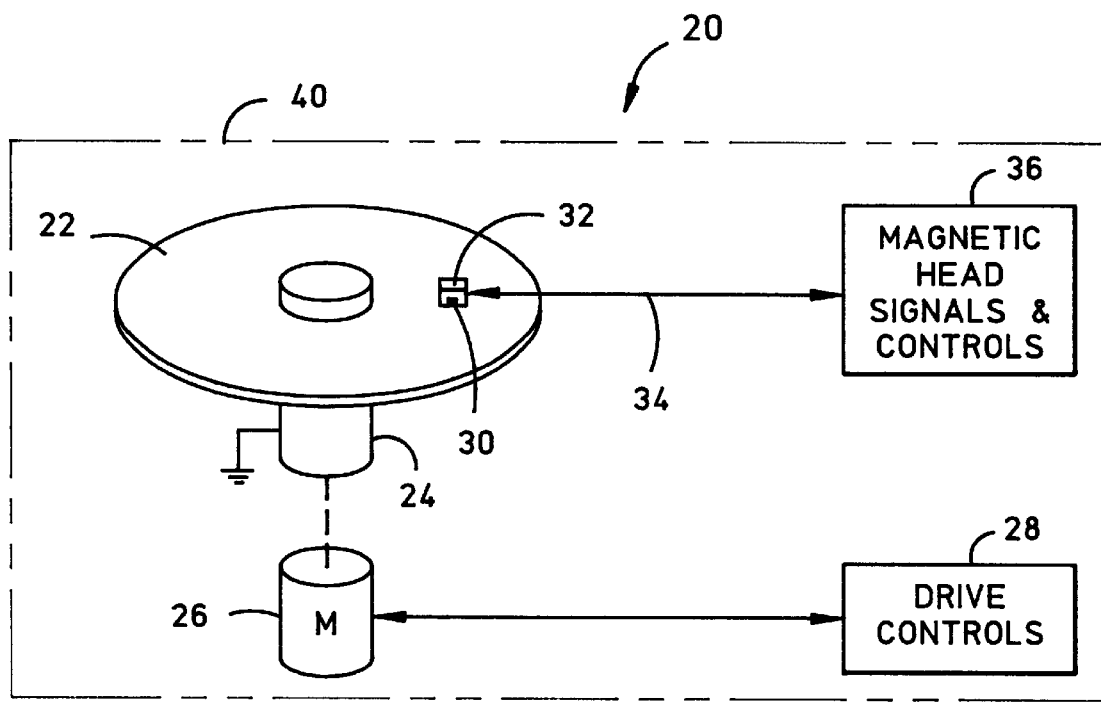
FIG. 1 is a schematic illustration of a magnetic disk drive which employs the present orthogonal MR read head.

Referring to the drawings wherein like reference numerals designate like or similar parts throughout the several views, there is illustrated in FIG. 1 a magnetic disk drive 20 which includes a rotatable magnetic disk 22. The disk 22 is supported by a spindle 24 which is rotated by a motor 26, the motor 26 being controlled by drive controls 28. A thin film MR read head 30 is mounted on a slider 32 which in turn is supported by a suspension 34. Typically a write head (not shown) is combined with the MR read head 30 so that signals can be written and read from the same slider 32. The signals to and from the combined head and its movements with respect to the magnetic disk 22 are controlled by magnetic head signals and controls 36. When the disk 22 is rotated, the slider 32 rides on a cushion of air (air bearing) which is generated by the movement of the disk 22. During the movement of the disk 22, the read head 30 is placed in a transducing relationship with respect to a circular data track shown at 38 in FIG. 2. The bottom surfaces of the slider 32 and the MR read head 30 are in a plane which is called an air bearing surface, hereinafter referred to as ABS. The ABS is spaced from the surface of the disk 22 by a distance in the order of 0.075 $\mu$m when the disk is rotating. These components are mounted within a housing 40.

Figure 2:
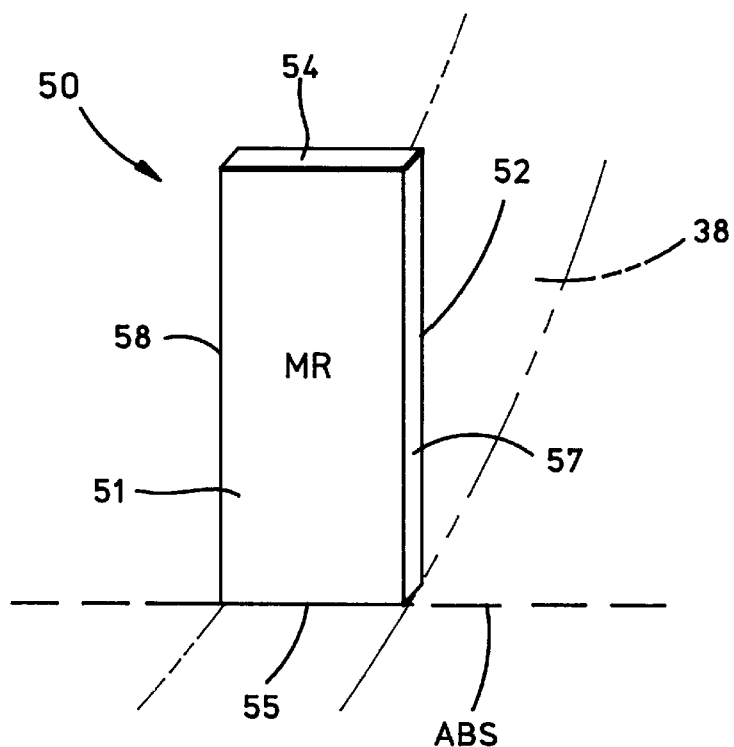
FIG. 2 is a schematic isometric illustration of a single MR stripe in relationship to an information-carrying track on a magnetic disk.
Figure 3:
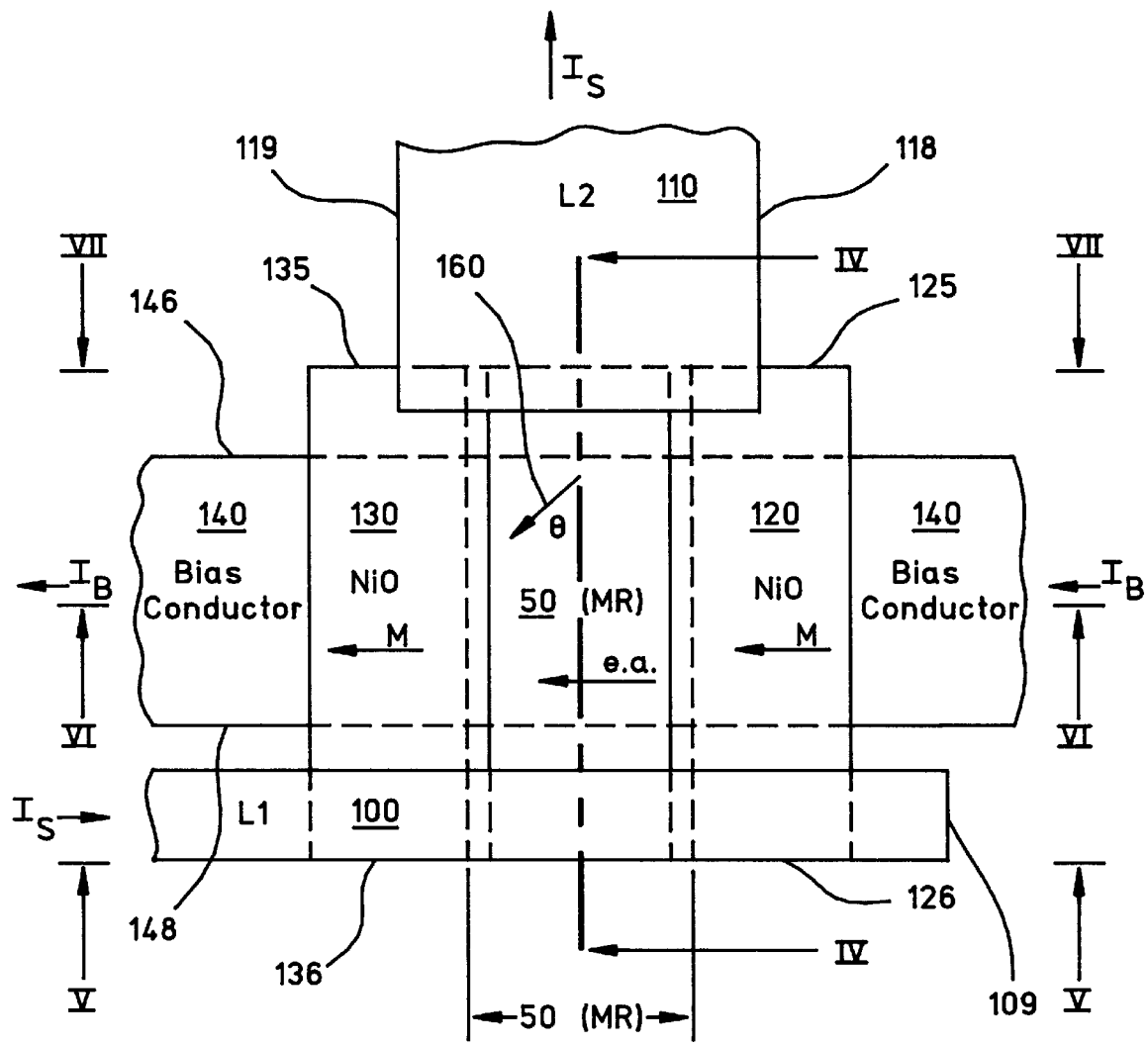
FIG. 3 is a schematic planar illustration of an orthogonal MR read head according to the invention with the gap and shield layers removed.
Figure 4:
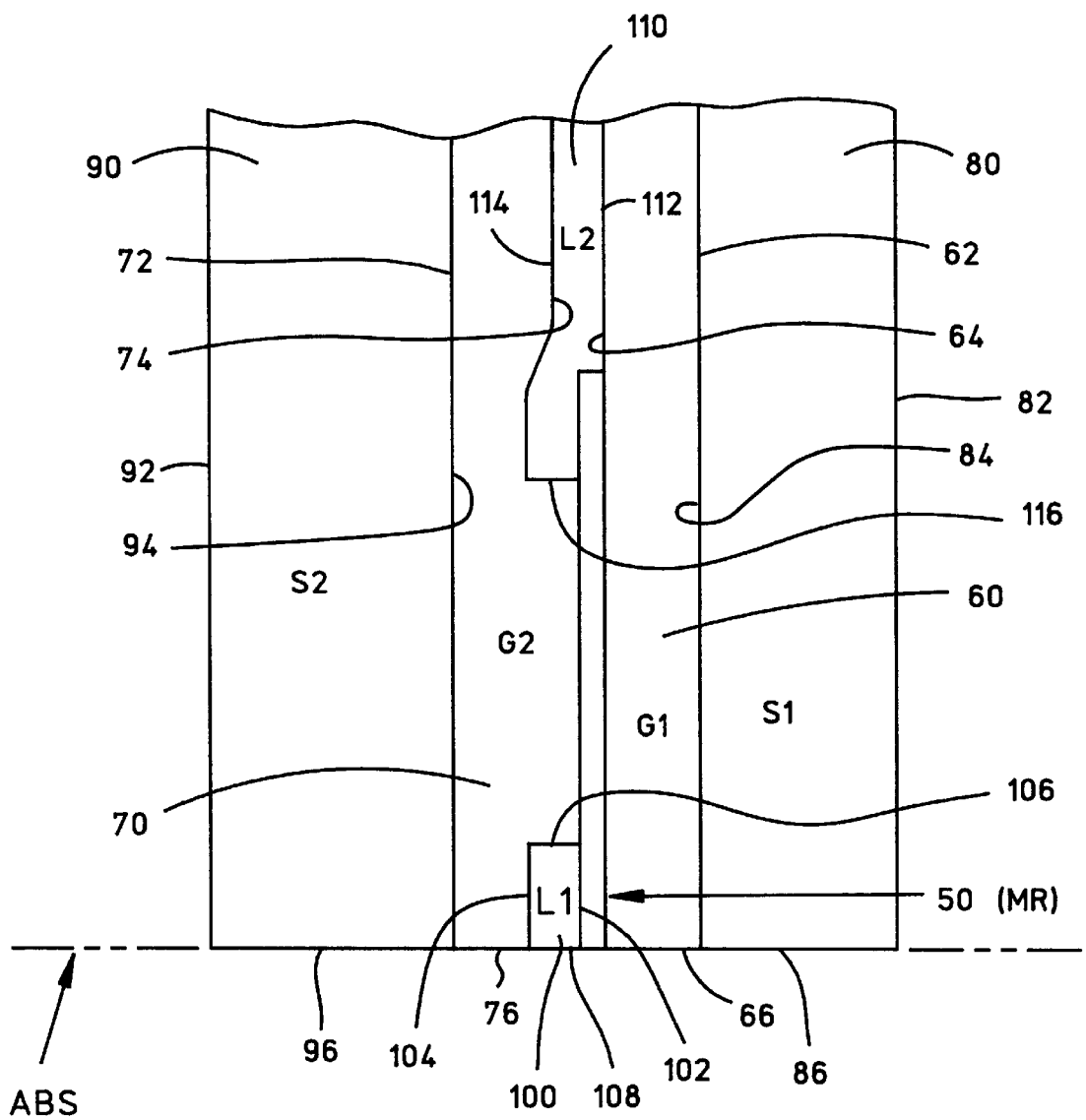
FIG. 4 is a lateral cross-sectional view taken along plane IV—IV of FIG. 3 with the gap and shield layers shown in place.

The MR read head 30 includes an MR stripe or layer 50 which is shown schematically in FIG. 2 above the circular track 38. As shown in FIG. 4, the MR stripe is sandwiched between a pair of insulative gap layers G1 and G2, shown at 60 and 70, which in turn are sandwiched between a pair of shield layers S1 and S2, shown at 80 and 90. First and second leads L1 and L2 shown at 100 and 110 are connected to the MR stripe in a spaced-apart relationship for conducting a sense current $I_s$ perpendicular to the ABS. The first lead L1 is connected to the MR stripe at the ABS and the second lead L2 is connected to a top edge of the MR stripe. Longitudinal biasing elements are magnetostatically coupled or exchange-coupled to the MR stripe 50 for biasing the MR stripe parallel to the ABS. As shown in FIG. 3, the longitudinal biasing elements include a pair of thin film biasing layers 120 and 130 which are connected to a pair of lateral edges of the MR stripe. A transverse biasing element is magnetically coupled to the MR stripe for biasing the MR stripe perpendicular to the ABS. The transverse biasing element includes a transverse biasing conductive layer 140 which extends parallel to the ABS and provides bias field to the MR stripe.

Figure 5:
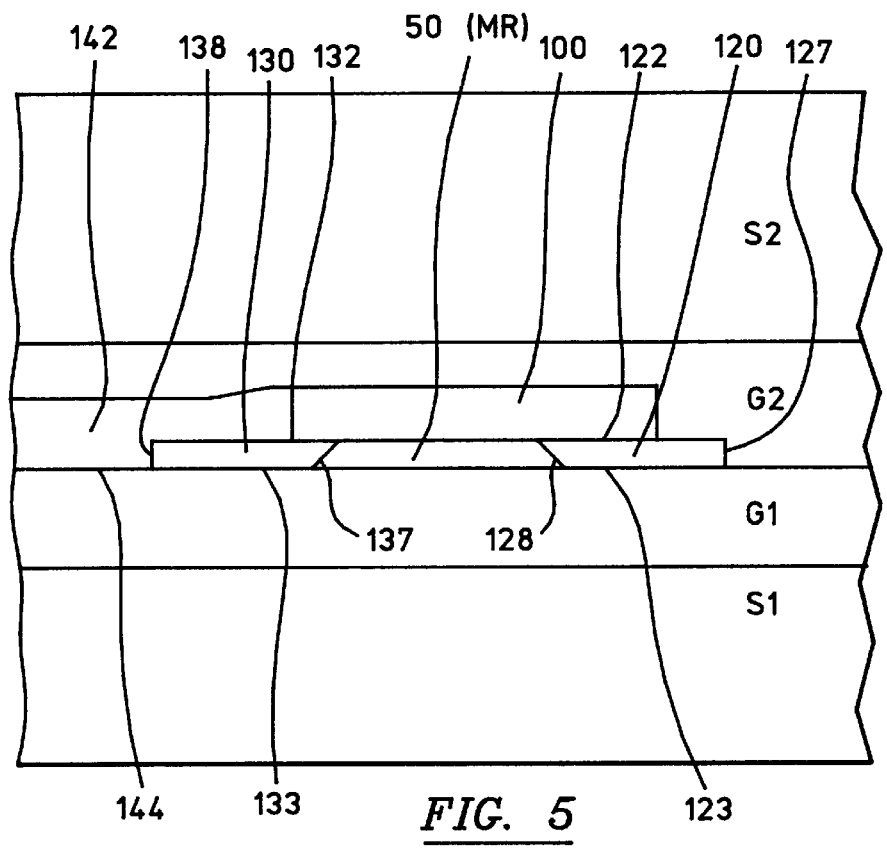
FIG. 5 is a longitudinal view at the ABS taken along plane V—V of FIG. 3 with the gap and shield layers shown in place.

As shown in FIGS. 2 and 4–9, the MR stripe has a pair of oppositely facing film surfaces 51 and 52 bounded by top and bottom edges 54 and 55 and a pair of lateral edges 57 and 58, the bottom edge 55 forming a portion of the ABS. As shown in FIG. 4, the first gap layer G1 has oppositely facing film surfaces 62 and 64 which are bounded in part by a bottom edge 66, the bottom edge forming a portion of the ABS. The second gap layer has oppositely facing film surfaces 72 and 74 bounded in part by a bottom edge 76 which forms a portion of the ABS. The first shield layer S1 has oppositely facing film surfaces 82 and 84, which are bounded in part by a bottom edge 86 which forms a portion of the ABS. The second shield layer 90 has oppositely facing film surfaces 92 and 94 which are bounded in part by a bottom edge 96, which forms a portion of the ABS. The first conductive lead layer 100 has oppositely facing film surfaces 102 and 104 bounded in part by top and bottom edges 106 and 108 and a lateral edge 109 (see FIG. 3). The second lead L2 has oppositely facing film surfaces 112 and 114 which are bounded in part by a bottom edge 116 and a pair of lateral edges 118 and 119 (see FIG. 3). As shown in FIGS. 3 and 5, the longitudinal bias layer 120 has oppositely facing film surfaces 122 and 123, which are bounded by top and bottom edges 125 and 126 and a pair of laterally-spaced lateral edges 127 and 128, the bottom edge 126 of the longitudinal bias layer forming a portion of the ABS. The longitudinal bias layer 130 has oppositely facing film surfaces 132 and 133, which are bounded by top and bottom edges 135 and 136, and a pair of laterally-spaced lateral edges 137 and 138, the bottom edge 136 of the longitudinal bias layer forming a portion of the ABS. As shown in FIGS. 3 and 5, the transverse biasing conductive layer 140 has a pair of oppositely facing film surfaces 142 and 144, bounded in part by top and bottom edges 146 and 148. The film surfaces of the MR stripe 50, the first and second gap layers G1 and G2, the first and second shield layers S1 and S2, the first and second conductive leads L1 and L2, the longitudinal biasing layers 120 and 130, and the transverse biasing layer 140 are substantially parallel with respect to one another and perpendicular to the ABS.

In one embodiment of the invention, the longitudinal biasing layers 120 and 130 are NiO, and are exchange bias coupled to the MR stripe 50. NiO is an antiferromagnetic nonconductive material which will not shunt a sense current Is conducted through the MR stripe between the leads L1 and L2. It is important that these longitudinal biasing layers 120 and 130 overlap the MR stripe, as shown in FIGS. 3 and 5–8, so that the exchange bias coupling induces a longitudinal magnetization vector in the MR stripe. This is accomplished by providing the lateral edges 57 and 58 of the MR stripe with a taper, as detailed in FIG. 8. The lateral edge 128 of the longitudinal biasing layer 120 is also tapered and is in intimate contact with the lateral edge 57 of the MR stripe and the lateral edge 137 of the longitudinal biasing layer 130 is also tapered and is in intimate contact with the other tapered edge 58 of the MR stripe. These tapered engagements then provide the necessary overlapping to establish the exchange bias coupling between the longitudinal biasing layers and the MR stripe. The longitudinal biasing urges the MR stripe into a substantially single domain state so as to reduce Barkhausen noise. If only longitudinal biasing is implemented, the magnetization vector of the MR stripe would be longitudinally oriented. This direction is changed, however, by transverse biasing described hereinbelow.

The exchange coupling connection is made so that the film surface 51 of the MR stripe 50 is co-planar with the film surfaces 122 and 132 of the longitudinal biasing layers 120 and 130. This enables the conductive lead layer L1 to make film surface engagement completely across the MR stripe and at least partially across both of the longitudinal biasing layers 120 and 130. This arrangement planarizes these components so that the MR read head is more planarized than prior art orthogonal MR read heads. This is important when a merged MR head is constructed which is a combination of an MR read head and a write head.

It should be noted that a single MR stripe is employed in the present invention in contrast to a pair of MR stripes employed by prior art orthogonal MR read heads. As shown in FIG. 3, the single MR stripe extends perpendicular to the ABS and has an easy axis which extends parallel to the ABS. Accordingly, the longitudinal biasing layers bias the MR stripe along its easy axis. In the prior art orthogonal MR read head a second MR stripe was employed for longitudinally biasing the first MR stripe. However, as stated hereinabove, this invariably over-biases the sense-current-carrying MR stripe, causing it to become highly impermeable and therefore insensitive to flux incursions from a magnetic disk rotating therebelow.

Figure 6:
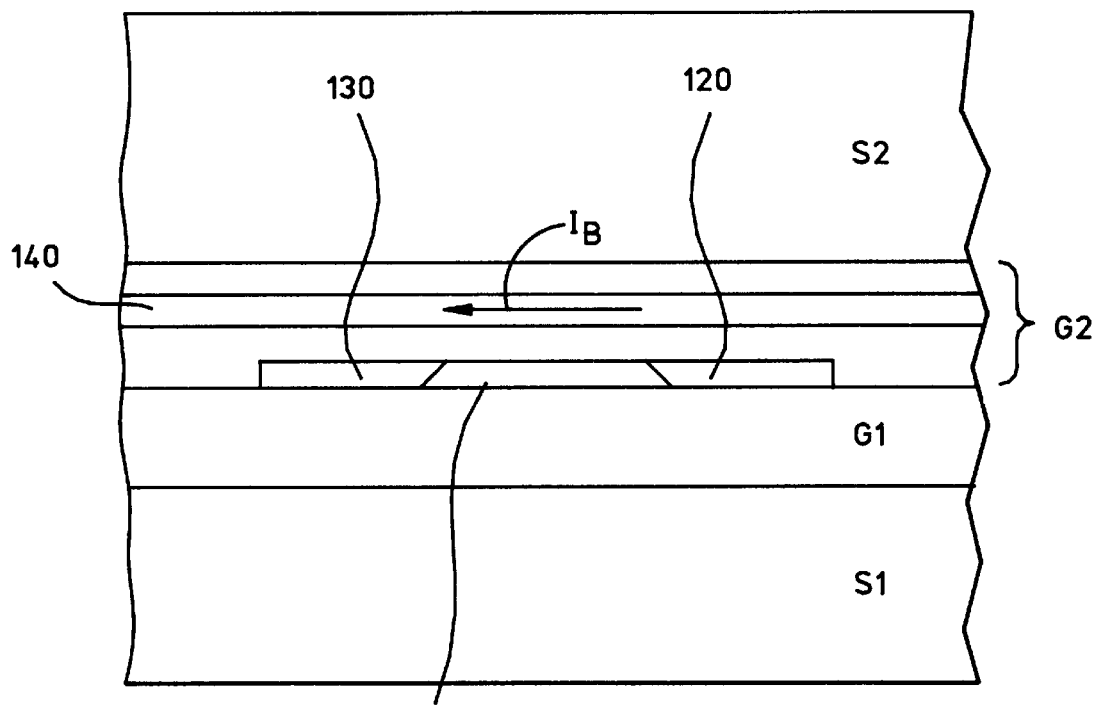
FIG. 6 is a longitudinal cross-sectional view taken along plane VI—VI of FIG. 3 with the gap and shield layers shown in place.
Figure 7:
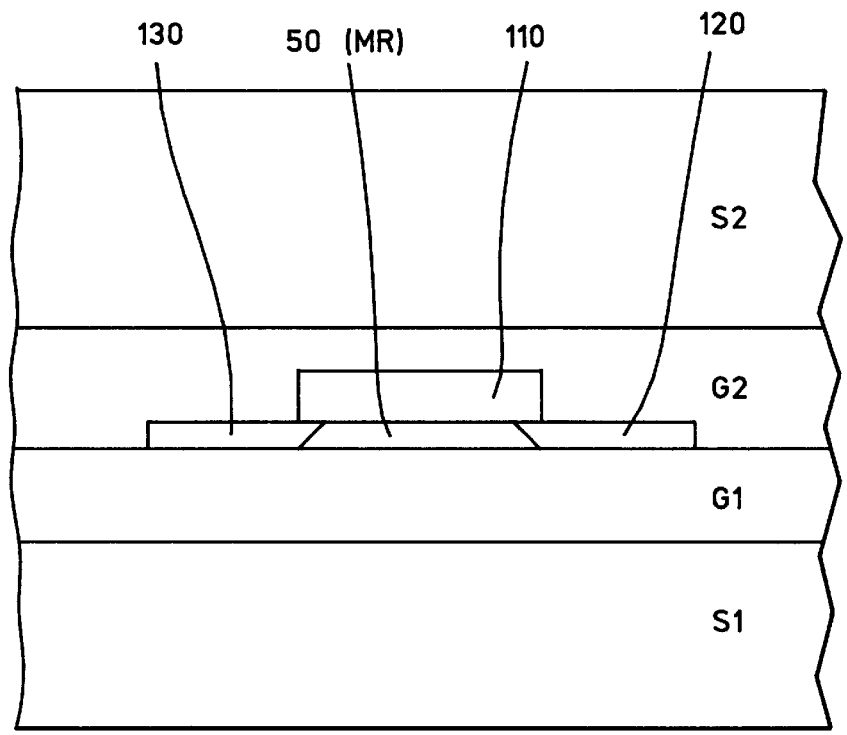
FIG. 7 is a longitudinal cross-sectional view taken along plane VII—VII of FIG. 3 with the gap and shield layers shown in place.
Figure 8:
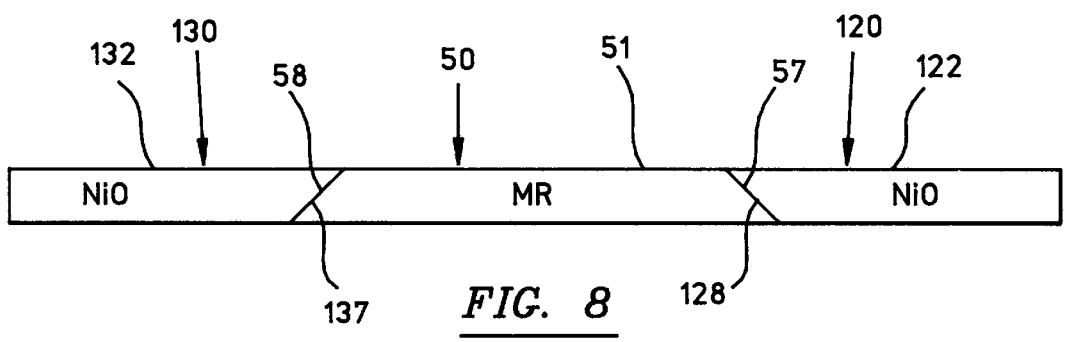
FIG. 8 is an enlarged schematic illustration of a pair of NiO layers exchange-coupled to a pair of lateral edges of the MR stripe of the orthogonal MR read head.

In the present invention, the transverse biasing is accomplished by a transverse biasing conductive layer 140 which may be embedded in the second gap layer G2, as shown in FIG. 6, so as to provide bias to the MR element 50. A predetermined bias current $I_B$ is conducted through the transverse biasing layer 140, which causes a magnetic field to be induced into the MR stripe. This magnetic field downwardly biases the magnetization vector in the MR stripe to the position of the arrow 160 shown in FIG. 3. The angle θ of this magnetization vector 160 with respect to a perpendicular to the ABS is known as the bias angle. The angle θ is preferably about 45°.

Figure 9:
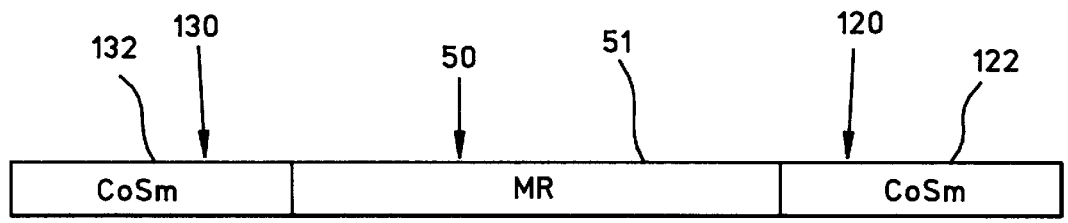
FIG. 9 is an enlarged schematic illustration of an optional longitudinal biasing arrangement wherein a pair of CoSm layers are magnetostatically coupled to a pair of lateral edges of the MR stripe of the orthogonal MR read head.

As shown in FIG. 9, a preferred embodiment of the invention employs longitudinal biasing layers 120 and 130 made of CoSm instead of NiO. CoSm is an amorphous material which has high resistance, high magnetization, and high coercivity. CoSm has an electrical resistivity over 100 $\mu\Omega$cm which is about five times the electrical resistivity of Permalloy ($Ni_{81}Fe_{19}$). Accordingly, CoSm will shunt very little of the sense current. With this arrangement, the pair of spaced-apart lateral edges of the MR stripe are non-tapered. Likewise, the lateral edges of the longitudinal biasing layers 120 and 130 are non-tapered and make intimate contact with the lateral edges of the MR stripe. The CoSm layers are arranged plus to minus to hard bias the MR stripe in a longitudinal direction. Again, the film surface 51 of the MR stripe and the film surfaces 122 and 132 of the longitudinal biasing layers 120 and 130 are co-planar, so that the conductor lead L1 can contact these elements in a planar fashion for purposes explained hereinabove. The thickness of the MR stripe and each longitudinal biasing layer is the same. To insure proper stabilization with this arrangement, $M_i t_i \geq M_2 t_2$ where $M_i$ equals remanent magnetization of CoSm, $t_i$ equals the thickness of the CoSm layer, $M_2$ equals saturation magnetization of the MR stripe and $t_2$ equals the thickness of the MR stripe. Since the MR stripe is typically Permalloy with a magnetization of 800 emu/cc the chemical composition of the CoSm should be 5%–20% atomic weight of Sm and the remainder Co to satisfy its magnetization. The coercivity should be at least 500 Oe which is easily satisfied with CoSm. CoCrPt can be substituted for CoSm since CoCrPt satisfies the high magnetization and high coercivity requirement. However, CoSm is preferred since the resistivity of CoCrPt is somewhat inferior to CoSm.

The importance of the planarization of the orthogonal MR read head is illustrated in FIGS. 10 and 11. FIG. 10 illustrates the typical prior art orthogonal MR read head where two MR stripes MR1 and MR2 are employed. In the fabrication of this head, a bottom lead layer is deposited on top of these MR stripes which causes the lead to have step heights 200 and 202. The subsequently deposited layers replicate the step height all the way to the second pole tip P2 of the write head. Consequently, the pole tip P2 has a curved configuration which causes the write head to write distorted bits of information which cannot be accurately read by the read head. It is important that the pole tip P2 of the write head be planar throughout its entire track width. This has been accomplished with the present invention as shown in FIG. 11. The longitudinal biasing layers are shown as CoSm on each side of the MR stripe and with the same thickness so that the MR stripe and the CoSm layers are planar at least throughout the track width. With this arrangement it can be seen that the subsequently deposited layers are likewise planar within the track width of the write head so that when the pole tip P2 of the write head is deposited it is also planar. With a planar pole tip P2 the bits of information are written so that they can be accurately read by the read portion of the merged MR head.

Figure 12:
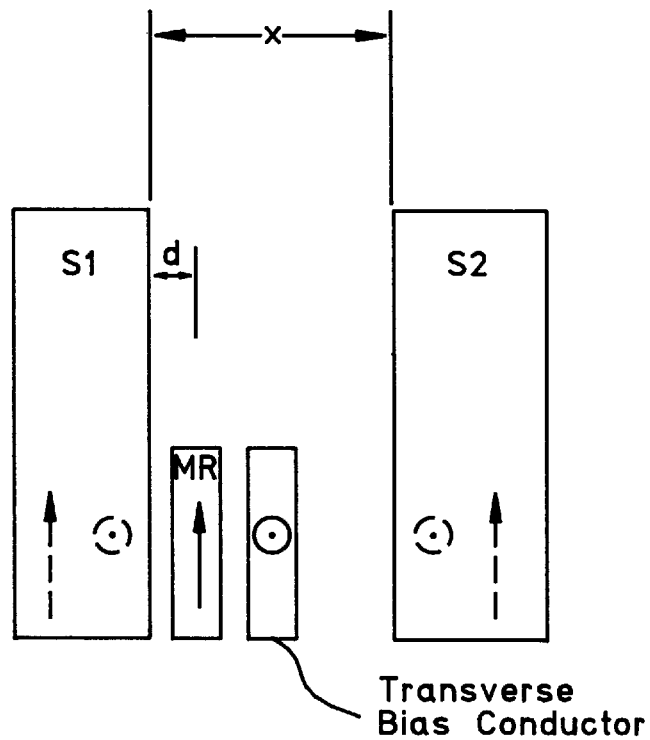
FIG. 12 is an arrangement of various layers of the orthogonal MR read head to enhance longitudinal biasing of the MR stripe.
Figure 13:
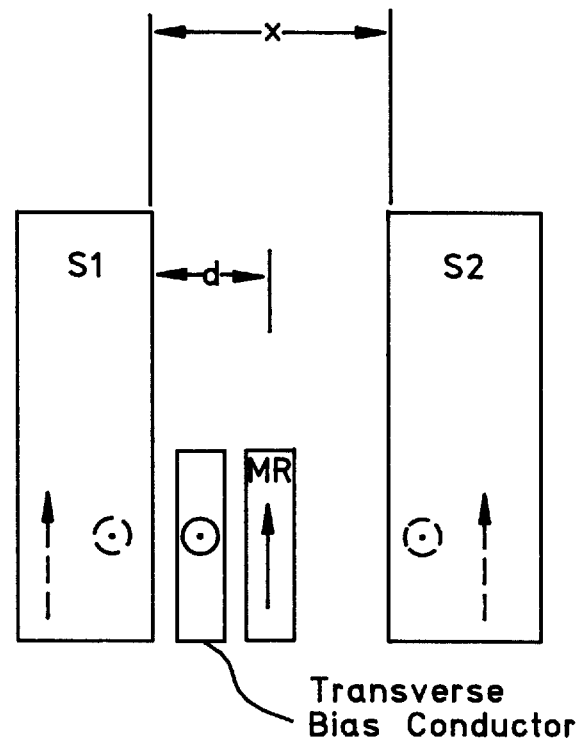
FIG. 13 is an arrangement of various layers of the orthogonal MR read head to enhance transverse biasing of the MR stripe.

The biasing of the head can further be improved by modifications schematically illustrated in FIG. 12 and 13. By properly positioning the MR stripe and the bias conductive layer with respect to the first and second shields S1 and S2, either or both of the longitudinal and transverse biasing of the MR stripe can be enhanced. As shown in FIG. 12, the transverse bias conductive layer is positioned midway between the first and second shields S1 and S2, and the MR stripe is positioned between the transverse bias layer and one of the shield layers such as S1. The full circle with a dot within the transverse bias conductor indicates that the direction of the bias current is toward the viewer. The full line arrow within the MR stripe indicates that the sense current is conducted from the ABS upwardly into the MR stripe. The bias current in the transverse bias conductor produces images of the bias current as shown by the dotted circles with a dot in the first and second shield layers S1 and S2. Since the transverse bias conductor is midway between the first and second shield layers S1 and S2, the effects of these image currents cancel one another. The sense current in the MR stripe is imaged in the first and second shield layers S1 and S2 as shown by the dotted arrows therein. Since the MR stripe is closer to the first shield S1 than it is to the second shield S2, the imaged sense current in the first shield S1 is stronger than the imaged current in the second shield S2. This means that the field produced by the image sense current in the first shield S1 enhances the longitudinal biasing of the MR stripe caused by the longitudinal biasing layers 120 and 130 (see FIG. 8).

Another arrangement is illustrated in FIG. 13, where the MR stripe is located midway between the first and second shield layers S1 and S2, and the transverse biasing conductor is located between the MR stripe and a particular one of the shield layers, such as shield layer S1. Since the MR stripe is located midway between the first and second shield layers S1 and S2, the effects of the sense current images in S1 and S2 are canceled. However, since the conductive bias conductor is closer to the shield layer S1 than it is to the shield layer S2 the bias current image in the first shield layer S1 is stronger than the bias current image in the second shield layer S2. With this arrangement, the image field from the bias current image in the first shield layer S1 enhances the bias field in the MR stripe from the transverse bias conductor.

It should be noted that other combinations can be envisioned from the descriptions of the embodiments shown in FIGS. 12 and 13. For instance, the MR stripe can be off-centered from the first and second shields S1 and S2, and the transverse bias layer can be located in the smaller spacing between the MR stripe and the respective shield layer. With this arrangement, both the longitudinal and transverse biasing of the MR stripe would be enhanced. In any event, the distance d between the MR stripe and a particular one of the shield layers should be x/2≧d≧x/4, where the distance between the first and second shield layers is x. The strength of the image field is equal to $$\frac{J}{2}\left(\frac{g_2 - g_1}{g_2 + g_1}\right)$$

where J is ampere/meter current per unit track width of the MR stripe.

An exemplary method of making the tapered lateral edges 57 and 58 of the MR stripe is schematically illustrated in FIGS. 14 and 15. FIG. 14 shows an MR thin film layer 180 which is normally constructed of NiFe. Dual layers of photoresist 182 and 184 are formed on top of the MR layer 180 with the photoresist 184 overhanging the photoresist layer 182 on each side thereof. The MR layer 180 is rotated while an ion beam, such as a reactive ion etching beam (RIE) 186, is directed at an angle θ onto the MR layer 180. This causes the MR layer 180 to be etched to the configuration shown in FIG. 15, which is the MR stripe 50. If the lateral edges 57 and 58 of the MR stripe are to be orthogonal, that is, non-tapered, then the etching beam 186 is directed straight down with angle θ equal to zero. This will configure the lateral edges of the MR stripe for connection to the hard biased layers CoSm, as shown in FIG. 9.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

I claim:

1. A combined head comprising:

an orthogonal magnetoresistive (MR) read head having an air bearing surface (ABS) and including an MR sensor which has only one orthogonal MR strip which extends perpendicular to the ABS, the MR sensor including a pair of oppositely facing MR film surfaces bounded by top and bottom MR edges and a pair of side MR edges, the bottom MR edge forming a first portion of the ABS;

the MR stripe having an easy axis which extends parallel to the ABS;

a pair of high resistivity longitudinal bias layers, each longitudinal bias layer having a pair of oppositely facing bias film surfaces which are bounded by top and bottom bias edges and a pair of laterally spaced side bias edges, the bottom bias edge of each longitudinal bias layer forming a second portion of the ABS;

one of the side bias edges of each longitudinal bias layer being adjacent one of the side MR edges of the MR sensor, respectively for biasing the MR strip parallel to the ABS;

each of the longitudinal bias layers having a material that has a resistance that is higher than any material of the MR sensor;

a write head which has a track width which extends laterally along the ABS and a write gap layer between first and second pole tip layers;

each of the longitudinal bias layers having a first thickness between the pair of oppositely facing bias film surfaces which is the same as a second thickness of the MR sensor between the pair of oppositely facing MR film surfaces and the bias film surfaces of each longitudinal bias layer being co-planar with the MR film surfaces of the MR sensor and extending beyond the track width;

first and second conductive lead layers, the first lead layer having a pair of oppositely facing lead film surfaces bounded in part by top and bottom lead edges, the bottom lead edge of the first lead layer forming a third portion of the ABS;

each of the lead layers having a planar extension parallel to the ABS which is in contact with one of the oppositely facing MR film surfaces of the MR sensor and both of the longitudinal bias layers; and said planar extension of the first lead being longer than the track width of the write head and extending laterally from the track width in first and second directions away from the track width of the write head so that the planar extension of the first lead promotes planarization of the write gap layer throughout the track width.

2. A combined head as claimed in claim 1 including:

first and second shield layers, each shield layer having a pair of oppositely facing shield film surfaces bounded in part by top and bottom shield edges, the bottom shield edge forming a fourth portion of the ABS;

first and second gap layers, each gap layer having a pair of oppositely facing gap film surfaces bounded in part by top and bottom gap edges forming a fifth poriton of the ABS;

the MR film surfaces of the MR sensor, the bias film surfaces of the longitudinal bias layers, the lead film surfaces of the first and second conductive lead layers, the shield film surfaces of the first and second shield layers and the gap film surfaces of the first and second gap layers being substantially parallel with respect to one another and substantially perpendicular to the ABS; and the MR sensor, the longitundinal bias layers and the first and second conductive lead layers being sandwiched between the first and second gap layers and the first and second gap layers being sandwiched between the first and second shield layers.

3. A combined head as claimed in claim 2 wherein:

the MR strip is NiFe and each of the longitudinal bias layers is CoSm; and a lateral edge of each CoSm layer being adjacent a respective lateral edge of the MR sensor.

4. A combined head as claimed in claim 3 wherein:

the MR strip is Permalloy; and each CoSm layer is 80–95% Co and 20–5% Sm by atomic weight, respectively.

5. An orthogonal merged magnetoresistive (MR) head that has a read head portion and a write head portion, each head portion having an air bearing surface (ABS) and the write head portion having a back gap that is recessed from the ABS comprising:

only one MR layer that has first and second substantially flat MR surfaces that are bounded by a first ABS edge at the ABS, a first recessed edge recessed from the ABS and first and second side MR edges that are substantially perpendicular to the ABS and that are laterally spaced from one another along the ABS;

first and second hard bias layers that are magnetized parallel to the ABS for longitudinally biasing the MR layer parallel and lateral to the ABS, each hard bias layer having first and second substantially flat bias surfaces that are bounded by a second ABS edge at the ABS, a second recessed edge recessed from the ABS and first and second side bias edges that are substantially perpendicular to the ABS and that are laterally spaced from one another along the ABS;

the second side bias edge of the first hard bias layer being adjacent the first side MR edge of the MR layer and the first side bias edge of the second hard bias layer being adjacent the second side MR edge of the MR layer so that the first side bias edge of the first hard bias layer and the second bias edge of the second hard bias layer are laterally spaced from the first and second side MR edges respectively of the MR layer in first and second directions respectively away from the MR layer;

the second MR surface of the MR layer having a laterally extending ABS end portion partially bounded by the first ABS edge of the MR layer and having a laterally extending recessed end portion partially bounded by the first recessed edge of the MR layer wherein the laterally extending ABS end portion and the laterally extending recessed end portion are spaced from one another along the MR layer between the first ABS edge and the first recessed edge of the MR layer;

first and second lead layers, the first lead layer having first and second substantially flat lead surfaces that are partially bounded by a third ABS edge at the ABS and a third recessed edge recessed from the ABS;

the first lead surface of the first lead layer interfacially engaging the laterally extending ABS end portion of the second MR surface of the MR layer and a portion of the second bias surface of each of the first and second hard bias layers adjacent the ABS;

the first lead surface of the second lead layer interfacially engaging the laterally extending recessed end portion of the second surface of the MR layer;

the first and second lead layers being spaced from one another along the MR layer between the ABS and recessed edges of the MR layer so that the hard bias layers are electrically in parallel with the MR layer and the first and second lead layers;

each of the MR layer and the first and second hard bias layers being a material with a resistance, the resistance of the material of the first and second hard bias layers being higher than the resistance of the material of the MR layer;

first and second pole tip layers, each of the first and second pole tip layers having first and second flat tip surfaces that are partially bounded by a fourth ABS edge at the ABS;

a write gap layer having first and second flat write gap surfaces that are partially bounded by a fifth ABS edge at the ABS:

the write gap layer being located between the first and second pole tip layers;

first and second shield layers, each shield layer having first and second flat shield surfaces that are partially bounded by a sixth ABS edge at the ABS;

a portion of the second shield layer being a common layer with the first pole tip layer;

first and second gap layers, each gap layer having first and second flat gap surfaces that are partially bounded by a seventh ABS edge at the ABS;

the MR layer, the first and second lead layers and the first and second hard bias layers being located between the first and second gap layers and the first and second gap layers being located between the first and second shield layers;

one of the first and second pole tips having a tip width that extends laterally along the ABS for defining a write track width of the write head portion;

the MR layer having a width that extends laterally along the ABS for defining a read track width of the read head portion;

the read track width of the read head being less than the write track width of the write head portion and being laterally centered with respect to the write track width of the write head portion;

the second bias surface of the first hard bias layer extending laterally in a first direction beyond the write track width of the write head portion and being substantially planar with the second MR surface, the second bias surface of the second hard bias layer extending laterally in a second direction beyond the write track width of the write head portion the first and second hard bias layers having substantially the same thickness as the MR layer; and the first lead layer extending laterally in both directions beyond the write track width of the write head portion and being planarized by said interfacial engagement with the laterally extending ABS end portion of the second MR surface of the MR layer and the second bias surfaces of the hard bias layers so that portions of the second gap layer, the second shield layer and the write gap layer adjacent the ABS are planarized.

6. A head as claimed in claim 5 wherein the first MR surface of the MR layer and the the first bias surfaces of the first and second hard bias layers lie in a first common plane and the second MR surfaces of the MR layer and the second bias surfaces of the first and second hard bias layers lie in a second common plane.

7. A head as claimed in claim 6 wherein the MR layer is NiFe and each of the hard bias layers is CoSm.

8. A head as claimed in claim 7 wherein the CoSm is 80%–95% Co and 20–5% Sm by atomic weight respectively.

9. A magnetic disk drive that has an orthogonal merged magnetoresistive (MR) head that has a read head portion and a write head portion, each head portion having an air bearing surface (ABS) and the write head portion having a back gap that is recessed from the ABS comprising:

only one MR layer that has first and second substantially flat MR surfaces that are bounded by a first ABS edge at the ABS, a first recessed edge recessed from the ABS and first and second side MR edges that are substantially perpendicular to the ABS and that are laterally spaced from one another along the ABS;

first and second hard bias layers that are magnetized parallel to the ABS for longitudinally biasing the MR layer parallel and lateral to the ABS, each hard bias layer having first and second substantially flat bias surfaces that are bounded by a second ABS edge at the ABS, a second recessed edge recessed from the ABS and first and second side bias edges that are substantially perpendicular to the ABS and that are laterally spaced from one another along the ABS;

the second side bias edge of the first hard bias layer being adjacent the first side MR edge of the MR layer and the first side bias edge of the second hard bias layer being adjacent the second side MR edge of the MR layer so that the first side bias edge of the first hard bias layer and the second bias edge of the second hard bias layer are laterally spaced from the first and second side MR edges respectively of the MR layer in first and second directions respectively away from the MR layer;

the second MR surface of the MR layer having a laterally extending ABS end portion partially bounded by the first ABS edge of the MR layer and having a laterally extending recessed end portion partially bounded by the first recessed edge of the MR layer wherein the laterally extending ABS end portion and the laterally extending recessed end portion are spaced from one another along the MR layer between the first ABS edge and the first recessed edge of the MR layer;

first and second lead layers, the first lead layer having first and second substantially flat lead surfaces that are partially bounded by a third ABS edge at the ABS and a third recessed edge recessed from the ABS;

the first lead surface of the first lead layer interfacially engaging the laterally extending ABS end portion of the second MR surface of the MR layer and a portion of the second bias surface of each of the first and second hard bias layers adjacent the ABS;

the first lead surface of the second lead layer interfacially engaging the laterally extending recessed end portion of the second surface of the MR layer;

the first and second lead layers being spaced from one another along the MR layer between the ABS and recessed edges of the MR layer so that the hard bias layers are electrically in parallel with the MR layer and the first and second lead layers;

each of the MR layer and the first and second hard bias layers being a material having a resistance, the resistance of the material of the first and second hard bias layers being higher than the resistance of the material of the MR layer;

first and second pole tip layers, each of the first and second pole tip layers having first and second flat tip surfaces that are partially bounded by a fourth ABS edge at the ABS;

a write gap layer having first and second flat write gap surfaces that are partially bounded by a fifth ABS edge at the ABS:

the write gap layer being located between the first and second pole tip layers;

first and second shield layers, each shield layer having first and second flat shield surfaces that are partially bounded by a sixth ABS edge at the ABS;

a portion of the second shield layer being a common layer with the first pole tip layer;

first and second gap layers, each gap layer having first and second flat gap surfaces that are partially bounded by a seventh ABS edge at said ABS;

the MR layer, the first and second lead layers and the first and second hard bias layers being located between the first and second gap layers and the first and second gap layers being located between the first and second shield layers;

one of the first and second pole tips having a width that extends laterally along the ABS for defining a write track width of the write head portion;

the MR layer having a width that extends laterally along the ABS for defining a read track width of the read head portion;

the read track width of the read head, being less than the track write width of the write head portion and being laterally centered with respect to the track write width of the write head portion;

the second bias surface of the first hard bias layer extending laterally in a first direction beyond the write track width of the write head portion and being substantially planar with the second MR surfaces, the bias second surface of the second hard bias layer extending laterally in a second direction beyond the write track width of the write head portion, the first and second hard bias layers having substantially the same thickness as the MR layer; and the first lead layer extending laterally in both directions beyond the write track width of the write head portion and being planarized by said interfacial engagement with the laterally extending ABS end portion of the second MR surface of the MR layer and the second bias surfaces of the hard bias layers so that portions of the second gap layer, the second shield layer and the write gap layer adjacent the ABS are planarized;

a frame;

a magnetic disk rotatably supported on the frame;

a support mounted on the frame for supporting the head in a transducing relationship with the magnetic disk;

means for rotating the magnetic disk;

positioning means connected to the support for moving the head to multiple positions with respect to said magnetic disk; and means connected to the head, to the means for rotating the magnetic disk and to the positioning means for exchanging signals with the head, for controlling movement of the magnetic disk and for controlling the position of the head.

10. A disk drive as claimed in claim 9 wherein the first MR surface of the MR layer and the first bias surfaces of the first and second hard bias layers lie in a first common plane, and the second MR surface of the MR layer and the second bias surface of the first and second hard bias layers lie in a second common plane.

11. A disk drive as claimed in claim 10 wherein the MR layer is NiFe and each of the hard bias layers is CoSm.

12. A disk drive as claimed in claim 11 wherein the CoSm is 80–95% Co and 20–5% Sm by atomic weight respectively.

* * * * *